United States Patent [19]

Jacob

[11] Patent Number: 4,944,607
[45] Date of Patent: Jul. 31, 1990

[54] REVOLVING GUIDING MEANS FOR ROLLING MEMBERS

[76] Inventor: Werner Jacob, Brianring 29, D-6000, Frankfurt/Main 70, Fed. Rep. of Germany

[21] Appl. No.: 378,132

[22] Filed: Jul. 11, 1989

[30] Foreign Application Priority Data

Jul. 16, 1988 [DE] Fed. Rep. of Germany ....... 3824191

[51] Int. Cl.$^5$ .............................................. F16C 29/06
[52] U.S. Cl. ......................................... 384/44; 384/47
[58] Field of Search ................. 384/44, 47, 45, 43; 464/168

[56] References Cited

U.S. PATENT DOCUMENTS

| | | | |
|---|---|---|---|
| 4,561,703 | 12/1985 | Dabringhaus | 384/44 |
| 4,637,739 | 1/1987 | Hattori | 384/45 |
| 4,755,065 | 7/1988 | Walter et al. | 384/47 |

*Primary Examiner*—Lenard A. Footland
*Attorney, Agent, or Firm*—Toren, McGeady & Associates

[57] ABSTRACT

Revolving guiding means in the form of individual cassettes serving to guide rolling members which are individually guided by cage elements having cylindrical portions which have a production axis extending at a right angle betweeen the centers of all rolling members contained in one cassette, furthermore, the individual cage elements are provided with guiding extensions arranged perpendicularly relative to the center plane and parallel to the center path which is the path covered by the center of a rolling member in the course of one revolution, so as to provide revolving guiding means which ensure safe guidance of the rolling member and which are suitable for balls and cylindrical rollers with inclined roller axes which axes may be inclined at different angles.

27 Claims, 5 Drawing Sheets

REVOLVING GUIDING MEANS FOR ROLLING MEMBERS

BACKGROUND OF THE INVENTION

The invention relates to revolving guiding means for rolling members having a basic member with two track portions extending in parallel and two curved deflecting portions connecting the two. One of the track portions is designed as a supporting track portion from which the rolling members project for the purpose of establishing contact with the guiding rail track and with the other return portion. The curved deflecting portions are designed to be at lest partially closed to permit load-free guidance, each of which comprises running tracks for the rolling member.

In the case of revolving guiding means for rolling members, the rolling members, at least in the region from where they project for the purpose of contacting the running track of the guiding rail, are normally secured by a holding element which prevents them from falling out. Otherwise, the rolling members in one revolving row contact each other directly.

In the case of bearing assemblies where the load is accommodated by revolving guiding means having cylindrical rollers, the axes of the cylindrical rollers in the support portions, but also in the curved deflecting portions and the return portion are always taken across a cage in such a way that they are aligned in one plane so as to be parallel relative to each other.

As horizontal and vertical forces have to be accommodated, it is necessary to provide two guiding parts whose cylindrical roller axes are arranged at an angle of 90° relative to each other. This means that for guiding a slide with a support in one vertical direction and two horizontal directions, a total of at least four revolving shoes with rollers have to be provided.

It is known in itself that rollers with inclined axes, whose axes intersect, are able to accommodate both horizontal and vertical loads.

SUMMARY OF THE INVENTION

Accordingly, it is an object of the present invention to provide revolving guiding means for rolling members in the case of which the latter are securely guided across the entire distance and where the exertion of force is avoided, with the principle of guidance being applicable to all species of rolling members, but at least balls and cylindrical rollers, and furthermore, it is proposed to preassemble the rolling members to facilitate final assembly of the guiding means.

Pursuant to this object, and others which will become apparent hereafter, one aspect of the present invention resides in each rolling member being guided so as to be laterally embraced by a cage element which, relative to the adjoining cage elements, comprises faces designed as cylindrical portions whose axis extends perpendicularly to the center plane through the centers of the rolling members. Additionally, the cage elements are provided with guiding extensions which extend vertically to the center plane and engage guiding grooves extending parallel to the center path.

By associating an individual cage element with each rolling member, jamming is avoided while at the same time effective holding and guidance of the rolling members is ensured. By providing cage elements in conjunction with guiding extensions it is possible to give the revolving guidance means a cassette-like design, thereby ensuring that even in the non-assembled condition the rolling members cannot fall out of the open supporting portion. Furthermore, the individual cage elements together with the guiding extensions and the grooves ensure a safe transfer from the open supporting portion into the region of the curved deflecting portion and vice versa. The individual cage elements in conjunction with the guiding extensions also prevent jamming. The cage elements comprise partially cylindrical outer faces by means of which they support each other.

In a further embodiment of the invention the guiding extensions, in the cross-sectional plane extending parallel to the center plane, have decreasing cross-sections towards the two ends pointing in the two directions of movement.

The cross-section of the guiding faces is preferably designed to be convex in a lens-shaped way. Even with close tolerances, such a design ensures an accurate transition and therefore accurate movement of the individual cage elements and the rolling members from the straight portions into the circular-arc-shaped portions and vice versa.

It is proposed that the central axis of the two guiding extensions of the cage element is identical to the axis of the cylindrical faces. But it is also possible for at least one of the two guiding extensions of a cage element to comprise a central axis which is offset relative to the axis of the cylindrical faces and to the center path of the rolling members, with the central axes of the guiding extensions being arranged so as to be offset on different sides of the center path.

In a further embodiment, the rolling members are designed as ball or cylindrical rollers.

To simplify assembly and production it is proposed to design the cage elements to be continuous and in the form of a strip and especially, to make them of plastics.

In a preferred embodiment, two adjoining cage elements are always connected to each other via a film hinge, with preferably only the guiding extensions of the two adjoining cage elements being always connected to each other by a film hinge.

Furthermore, the revolving guiding means are intended to permit the cylindrical rollers and the running tracks to be arranged at the guiding rail so that both horizontal and vertical forces can be accommodated, and at the same time it is ensured that the rollers are accurately guided in all portions of the revolving guiding means without jamming.

This is achieved by the running tracks in the basic member being arranged so as to be inclined relative to the center plane containing the centers of all cylindrical rollers, and parallel relative to the center path of the cylindrical rollers.

Such a design permits the axes of the cylindrical rollers to extend at an angle and by combining two sets of such revolving guiding means it is possible to provide an assembly suitable for receiving both vertical and horizontal forces. In this way it is possible to eliminate two revolving shoes as compared to prior art bearing assemblies. In the case of a bearing assembly intended to be capable of accommodating horizontal forces in both vertical and horizontal directions, it is possible to eliminate four revolving shoes. The change in the center-to-center distance resulting from the cylindrical rollers extending at an angle does not adversely affect easy running and a safe transfer into the region of the curved deflecting portions. A cage such as used in prior art guiding means for cylindrical rollers is not suitable for cylindrical rollers with inclined axes because the cage would have to be adapted to a considerable extent to the change in distances. In the longitudinal direction, transversely to the axes of the cylindrical rollers, it would have to be designed to be flexible, but such a design is not possible.

In a further embodiment, there are provided two running tracks inclined at different angles relative to the center plane, as well as two sets of cylindrical rollers.

It is possible to provide two separate running tracks, with the two sets of cylindrical rollers being alternately associated with one of the running tracks, forming a crossed roller bearing, with the tracks enclosing an angle of 90° between them. In spite of the fact that the revolving guiding means are associated with cylindrical rollers whose axes alternately extend at an angle, only one type of element is required. The alternate, different inclination of the roller axis can be achieved during assembly by simply turning the cage element containing the cylindrical roller. Furthermore, the cage elements ensure that, in the region of the curved deflecting portions, the cylindrical rollers cannot contact each other. Cylindrical rollers arranged cross-wise have a further advantage in that they ensure accurate alignment of the guiding means, i.e. of the cassette containing the rolling members, relative to the guiding rail. This means that, in addition, one single row of rolling members is capable of accommodating both contact forces and lateral forces in two directions. This design ensures accurate centering like a prism.

Furthermore, it is proposed to provide two offset rows of cylindrical rollers whose roller axes intersect between the two center planes. This results in a unit where one row contains cylindrical rollers whose axes are inclined in one direction, whereas the axes of the cylindrical rollers of the other row are inclined in the opposite direction. Both are contained in a cassette to form one unit.

In case there have been provided revolving guiding means where the axes of the cylindrical rollers alternate in their angle of inclination, the length of the cylindrical rollers has to be smaller than their diameter. This measure avoids jamming.

Furthermore, to simplify production, it is possible to divide the basic member in the center plane, with each of the parts produced in this way having a guiding groove.

To further simplify production it is proposed that the two parts of the basic member be designed in the form of cup elements formed from plate metal, which are associated with filler pieces to achieve the necessary strength.

Finally, it is proposed that the guiding grooves should constitute formed plate metal parts associated with the parts of the basic member, i.e. an edge of the basic member itself is used for guiding purposes. In this way, it forms a side wall of the guiding groove, whereas the other side wall is provided by the formed plate metal part.

The novel features which are considered as characteristic for the invention are set forth in particular in the appended claims. The invention itself, however, both as to construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
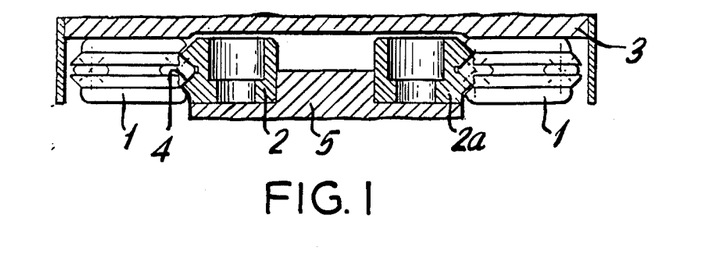
FIG. 1 is a cross-section through a bearing assembly.
Figure 2:
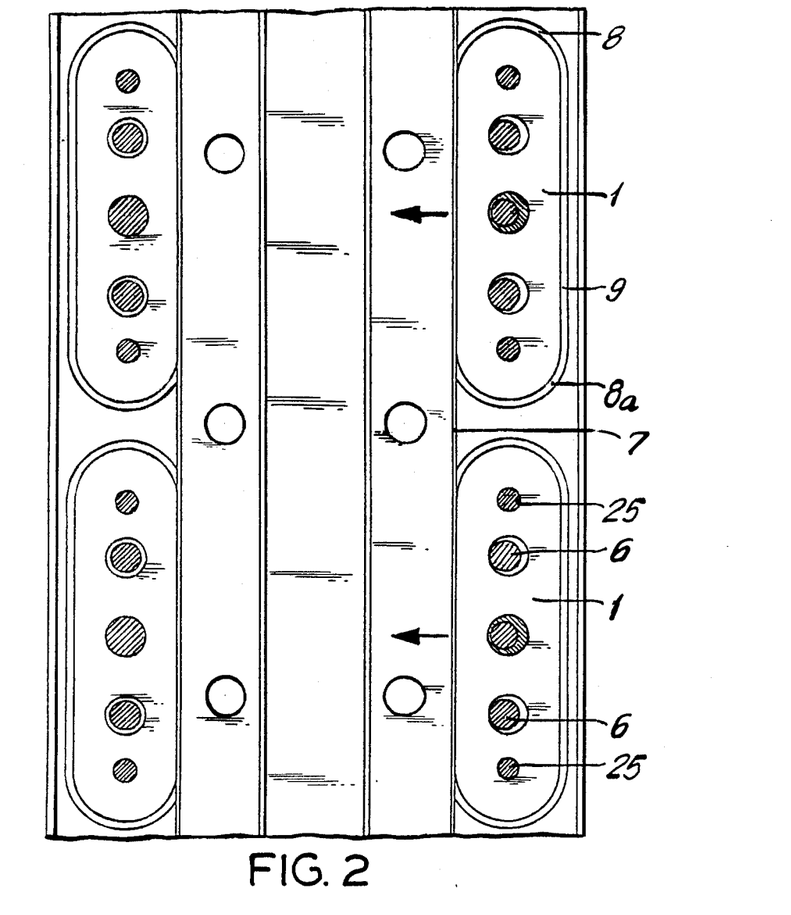
FIG. 2 is a lateral view according to FIG. 1, with the lower support having been removed.

The bearing assembly as shown in FIGS. 1 and 2 comprises a slide 3 associated with a total of four cassettes 1 comprising one unit of revolving guiding means each. The cassettes 1 are connected to the slide 3 which they have to guide by fixing bolts 6 and fitting pins or fitting bolts 25. In straight portions facing guiding rail portions 2, 2a, the cylindrical rollers of the individual cassettes 1 project from the cassettes and are guided on guiding rail running tracks 4. In the embodiment of FIGS. 1 and 2, the guiding rail is divided into two portions, with one portion 2, 2a always cooperating with two cassettes 1. The two guiding rail portions 2, 2a being attached to a lower support 5.

The subsequent FIGS. 3 to 10 give further details in the individual cassettes 1 and the guiding rails 2, 2a.

Figure 3:
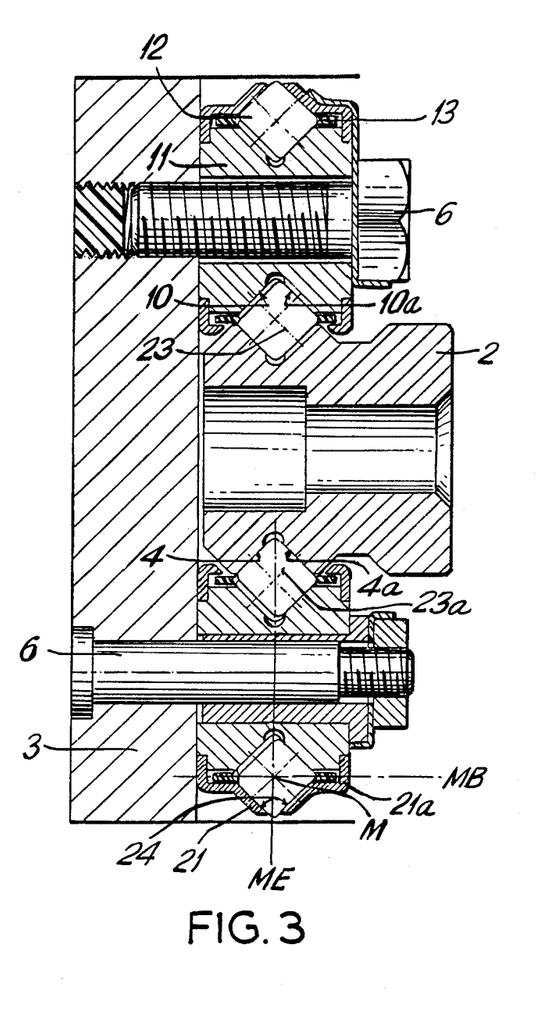
FIG. 3 is a cross-section through a first embodiment of the revolving guiding means with crossed rollers.

FIG. 3 shows a first embodiment in which two cassettes 1 are attached to a slide 3 via fixing bolts 6 and are jointly movable relative to the guiding rail 2. Each of the two cassettes 1 comprises one unit of revolving guiding means for alternately inclined cylinder rollers 12, 12a. For each cassette 1, the guiding rail 2 comprises two running tracks 4, 4a. The visible rolling members 12 are supported on a running track 10 of the basic member 11 on the one hand and on the running track 4 of the guiding rail 2 on the other hand. The rolling members 12, with one end face, slide in a load-free way on the other guiding rail track 4a. In the course of rolling, the cylindrical roller 12 rotates around its axis 23. The running track 10 extends at an angle relative to an imaginary plane ME extending through the centers M of all the cylindrical rollers 12 contained in one unit of revolving guiding means. Furthermore, the running track 10 extends parallel to the center path ME along which the cylindrical rollers 12, 12a or their centers M travel when moving in the revolving guiding means.

The cylindrical roller 12 covers the cylindrical roller 12a positioned behind it, whose roller axis 23a intersects the roller axis 23. The cylindrical roller 12a is supported on the track 10a of the basic member 11 on the one hand and on the guiding rail track 4a on the other hand. It can be seen that the two tracks 10, 10a of the basic member 11 and the tracks 4, 4a of the guiding rails 2 each enclose an angle of 90° in order to avoid jamming, the cylindrical rollers 12, 12a are under-squared, meaning that their length is smaller than their diameter. In consequence, there exists play for example between the end faces of the rollers and the respective other running track 10 and 4.

Figure 4:
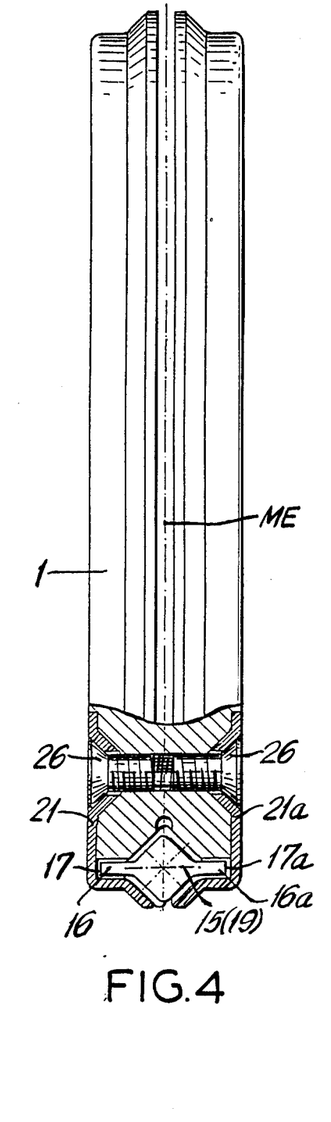
FIG. 4 is a lateral view showing only one cassette of the revolving guiding means of FIG. 3, partially in a plan view and partially in section.
Figure 5:
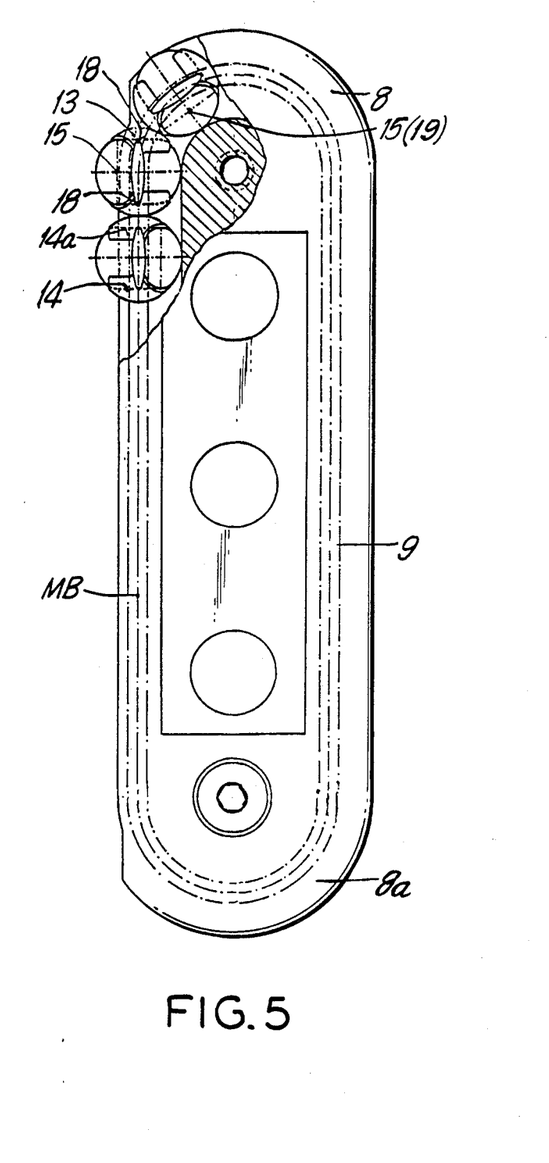
FIG. 5 is a plan view of FIG. 4.

Each cylindrical roller 12, 12a is associated with a cage element 13 explained in greater detail in FIGS. 4 and 5. This cage element 13 comprises guiding extensions 16, 16a guided in guiding grooves 17, 17a. The guiding grooves 17, 17a extend along the entire revolving guiding means and particularly in the open region, i.e. the region where the cylindrical rollers 12, 12a contact the running tracks 4, 4a of the guiding rails 2, serve to guide the cylindrical rollers 12, 12a. The guiding grooves 17, 17a may be formed in different ways. In the embodiment of FIG. 3, the guiding grooves are produced by the side faces of the basic member 11 in conjunction with the formed plate metal parts 21, 21a, with the formed plate metal parts 21, 21a additionally forming a counter track or guiding track 24 for the cylindrical rollers 12, 12a, especially in the region of the curved deflecting portions and in the return portion.

FIG. 4 shows a lateral view of a cassette, partially in section, and FIG. 5 shows a plan view of the same cassette, also partially in section. The two Figures demonstrate that the formed plate metal parts 21, 21a cover the side edges of the basic member 11 in such a way that grooves 17, 17a are formed. The formed plate metal parts 21, 21a are connected to the basic member 11 by bolts 26. The guiding grooves 17, 17a extend parallel to the center path MB of the cylindrical rollers 12, 12a. This is the path covered by the center M of a cylindrical roller 12, 12a during one revolution. As is particularly obvious from FIG. 5, the cylindrical rollers 12, 12a are arranged so as to be inclined alternately, and are laterally embraced by a cage element 13. Each cage element 13, comprises cylindrical portions 14, 14a, whose axis 15 extends at a right angle relative to the lane ME extending between the centers M of all cylindrical rollers 12, 12a received in the cassette 1 and also through the center M of the received cylindrical rollers 12, 12a. Furthermore, the individual cage elements 13 comprise guiding extensions 16, 16a extending in a plane which extends at a right angle relative to the center plane ME. As can be seen in FIGS. 4 and 5, the guiding extensions 16, 16a may be arranged in such a way that their central axis 19 coincides with the axis 15 of the cylindrical portions 14, 14a, or there may be an offset, as can be seen in connection with FIG. 8.

The guiding extension 16 is guided in the guiding groove 17 and the guiding extension 16a in the guiding groove 17a. Since in the deflecting region, i.e. in the region of transfer from the straight line to the deflecting arc, there exists a risk of jamming if there is not sufficient play for the guiding extensions 16, 16a in the grooves 17, 17a, a lens-like design is used for the guiding extensions 16, 16a, in cross-section, in order to achieve close guiding tolerances. Towards the ends 18, 18a, i.e. between the two directions of movement of the cylindrical rollers 12, 12a in the guiding rail 2, the guiding extensions 16, 16a comprise a tapered cross-section. The extensions are lens-shaped and their limiting faces essentially have a curvature which approximately corresponds to the loop radius, i.e. the outer limiting radius of the guiding grooves 17, 17a, i.e. their greatest radius. Because of the guiding principle involved, it is thus possible to achieve a soft transition and transfer of the cylindrical rollers 12, 12a from the open region, a transfer which is necessary for the cylindrical rollers 12, 12a to be able to establish contact with the running tracks 4, 4a of the guiding rails 2, 2a, into the region of the curved deflecting portions. This permits the use of the cassette design and it means that it is possible to provide pre-assembled units of revolving guiding means which may then be associated by the user with a slide and a guiding rail.

FIG. 5 shows that only one embodiment of cage elements 13 is required for optionally providing cylindrical rollers 12, 12a with different roller axis inclinations.

Figure 6:
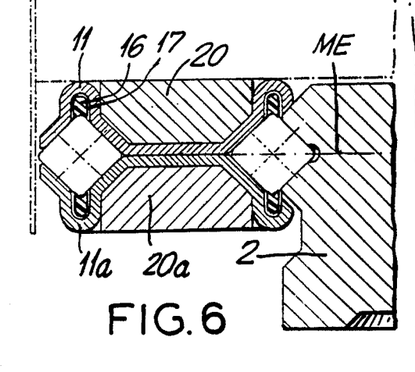
FIGS. 6 and 6a to 8, show cross-sections of different alternative embodiments of the revolving guiding means.

In the embodiment of FIG. 6, a guiding rail 2 is associated with differently designed revolving guiding means. On the lefthand side of the drawing, i.e. in drawing 6, there is illustrated a cassette comprising a basic member 11, 11a produced of two plate metal parts. The two basic member parts 11, 11a are produced by pressing, with the grooves 17 and 17a being formed at the same time, just like the guiding faces 24 in the region of the curved deflecting portions and the return track. Furthermore, for the sake of simplicity, FIG. 6 only shows the guiding extensions 16, 16a associated with the guiding grooves 17, 17a. In the embodiment shown in the righthand half of the Figure (FIG. 6a), the basic member is also divided, it being divided in the center plane ME. The two halves 11, 11a are designed to be solid. The two guiding grooves 17, 17a, the region of the curved deflecting portion and the return track as well as the two guiding faces 24, 24a have been produced by bending or extrusion.

Figure 6A:
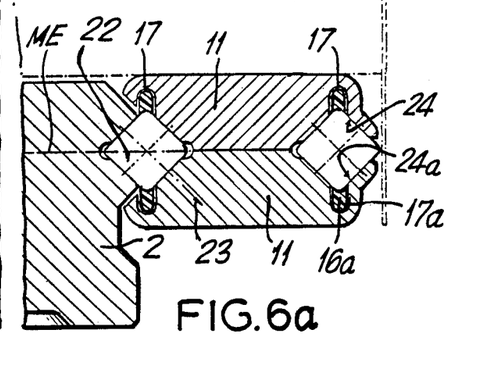

In the embodiment of FIG. 6a, the basic member 11, 11a is separated into two parts, separation taking place in the region of the center plane ME. The guiding groove 17, 17a are worked into the respective basic member parts 11, 11a.

Figure 7:
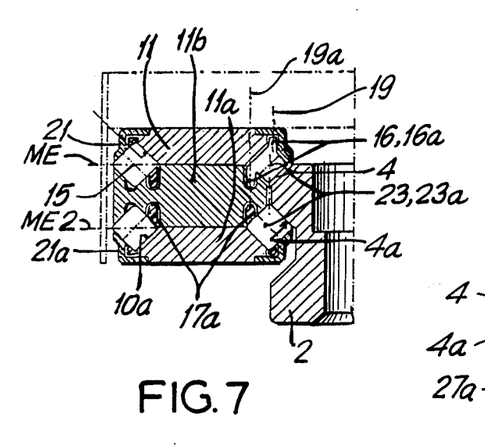

FIG. 7 shows a different embodiment, with two units of revolving guiding means being accommodated in one cassette 1. The basic member consists of three parts, i.e. 11, 11a and 11b. The two parts 11, 11a comprise a track 10 and 10a respectively, and the guiding rail 2 comprises tracks 4, 4a associated therewith. The axes 23 of the cylindrical rollers 12 associated with the tracks 10 and the basic member 11 and with the tracks 4 of the guiding rail 2 ar inclined in a direction facing away from the center plane ME 1 containing the centers M of the cylindrical rollers 12, just like the cylindrical rollers 12a relative to the center plane ME 2, so that the axes 23 and 23a of the two cylindrical rollers 12 and 12a intersect between the two center planes ME 1 and ME 2. The guiding grooves 17, 17a ar also formed b y the side edges of the basic member elements 11, 11a in conjunction with formed plate metal parts 21, 21a. However, the guiding grooves 17a are associated with the central part 11 of the basic member. It can also be seen that the cage elements 13 comprise offset guiding extensions 16, 16a, i.e. the guiding grooves 17, 17a and the guiding extensions 16, 16a have been provided with central axes 19, 19a which extend so as to be offset relative to the central axis 15 of the cylindrical faces 14, 14a. This means that the guiding grooves 17, 17a are arranged so as to be offset in parallel relative to the center path ME of the centers M of the cylindrical rollers 12, 12a.

Figure 8:
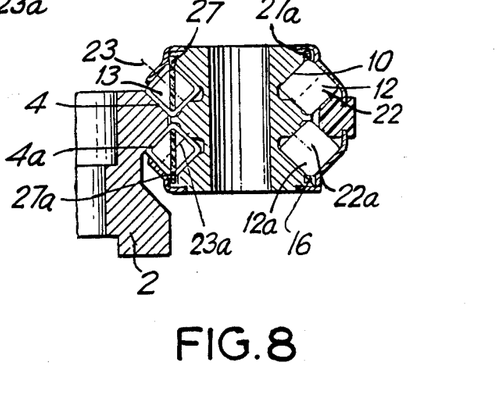

The embodiment of FIG. 8 has also been provided with two roller rows 22, 22a whose cylindrical rollers 12, 12a have differently inclined roller axes 23, 23a. With regard to the rollers in contact with the tracks 4, 4a of the guiding rail 2, the section is such that it extends through the region of separation of two adjoining cage elements 13. The cage elements 13 are produced continuously in the form of a strip, and in the region of the adjoining cylindrical portions the cage elements 13 are connected to each other by a film hinge 27. The infinite strip of cage elements 13 connected via film hinges is made of plastics. Preferably, a connection is provided in the region of the guiding extensions 16 only. Furthermore, because of the continuous design, only one guiding extension 16 is required because additional support is provided by the cover designed in the form of molded plastic parts and a rim between the two tracks in the basic member.

Figure 9:
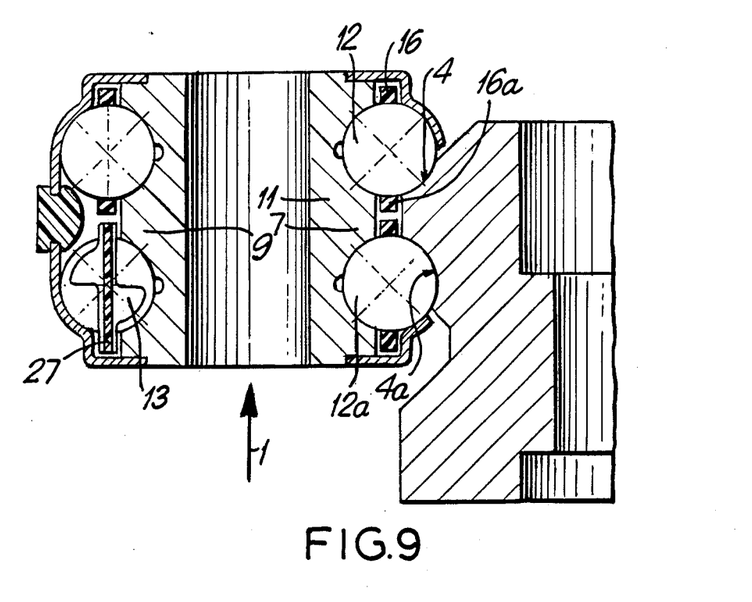
FIG. 9 shows revolving guiding means with the rolling members being balls.

FIG. 9 finally shows an embodiment of revolving guiding means having rolling members 12, 12a in the form of balls. The section extends through the center of the rolling members 12. It can also be seen that the cage element 13 is provided with two guiding extensions 16, 16a.

Figure 10:
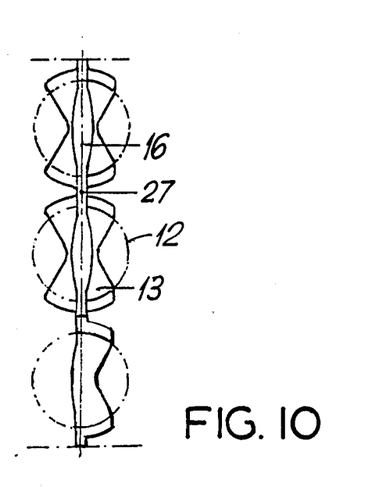
FIG. 10 shows part of a developed view of a cage strip.

FIG. 10 shows a developed view of a cage strip consisting of cage elements 13 produced so as to becontinuous, such as is used for example for revolving guiding means according to FIG. 9. The individual cage elements 13 are connected to each other in the region of their guiding extensions 16, 16a by a film hinge 27. This film hinge 27 ensures movability around a vertical axis so that the individual cage elements 13 may assume angular positions relative to each other, thereby supporting each other with their partially cylindrical outer faces.

While the invention has been illustrated and described as embodied in revolving guiding means for rolling members, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by letters patent is set forth in the appended claims.

1. Revolving guiding means for rolling members, comprising:
   a basic member having two extending parallel track portions and two curved deflection portions connecting the two track portions, a first one of the track portions being provided as a supporting track portion from which the rolling members project so as to establish contact with a guiding rail track, a second one of the track portions and the curved deflecting portions being at least partially closed so as to permit load-free guidance, each of the portions having running tracks for the rolling members; and
   a plurality of adjoining cage elements (13, 13a) each having, relative to adjoining cage elements, faces with cylindrical portions (14, 14a) having an axis (15), the cylindrical portions (14, 14a) being arranged so that the axis (15) extends perpendicularly to a center plane (ME) through the center (M) of the rolling members (12, 12a), each rolling member (12, 12a) being guided so as to be laterally embraced by a cage element, the cage elements (13, 13a) further having guiding extensions (16, 16a) arranged so as to extend vertically to the center plane (ME) so as to engage guiding grooves (17, 17a) parallel to a center path (MB) of the rolling members.

2. Revolving guiding means according to claim 1, wherein the guiding extensions (16, 16a), in a cross-sectional plane extending parallel to the center plane (ME), have decreasing cross-sections towards their ends (18, 18a) pointing in the two directions of movement.

3. Revolving means according to claim 2, wherein the guiding extensions (16, 16a) have a cross-section that is convex in a lens-shaped manner.

4. Revolving guiding means according to claim 1, wherein the two guiding extensions (16, 16a) of a cage element (13) have a central axis (19) identical to the axis (15) of the cylindrical portions (14, 14a).

5. Revolving guiding means according to claim 1, wherein at least one of the two guiding extensions (16, 16a) of a cage element (13) comprises a central axis (19, 19a) which is offset relative to the axis (15) of the cylindrical portions (14, 14a and to the center path (MB) of the rolling members (12, 12a).

6. Revolving guide means according to claim 5, wherein the central axes (19, 19a) of the guiding extensions (16, 16a) are arranges so as to be offset on different sides of the center path (MB).

7. Revolving guiding means according to claim 1, wherein the rolling members (12, 12a) are balls.

8. Revolving guiding means according to claim 1, wherein the rolling members (12, 12a) are cylindrical rollers.

9. Revolving guiding means according to claim 8, wherein two offset rows (22, 22a) of cylindrical rollers (12, 12a) are provided having roller axes (23, 23a) which intersect their two center planes (MEI, ME2).

10. Revolving guiding means according to claim 1, wherein the basic member (11, 11a) is divided in the center plane (ME) so as to form two parts each having a guiding groove (17, 17a).

11. Revolving guiding means according to claim 10, wherein the two parts of the basic member (11, 11a) are cup-shaped and made from plate metal, and further comprising filler pieces (20, 20a) associated with the cup-shaped parts.

12. Revolving guiding means according to claim 8, wherein the running tracks (10, 10a) in the basic member (11) are arranged so as to be inclined relative to the center plane (ME) containing the centers (M) of all cylindrical rollers (12, 12a) and parallel relative to the center path (MB) of the cylindrical rollers (12, 12a).

13. Revolving guiding means according to claim 12, wherein there are provided two running tracks (10, 10a) inclined at different angles relative to the center plane (ME), as well as two sets of cylindrical rollers (12, 12a).

14. Revolving guiding means according to claim 13, wherein the two sets of cylindrical rollers (12, 12a) are alternately associated with one of the running tracks (10, 10a) so as to form a crossed roller bearing.

15. Relvolving guiding means according to claim 14, wherein the cylindrical rollers (12, 12a) have a length smaller than their diameter.

16. Revolving guiding means according to claim 13, wherein the tacks (10, 10a) are arranged so as to enclose an angle of 90° between them.

17. Revolving guiding means according to claim 1, wherein the guiding grooves (17, 17a) constitute formed plate metal parts (21, 21a) associated with the basic member (11, 11a).

18. Revolving guiding means according to claim 1, wherein the cage elements (13) are continuous and strip-shaped.

19. Revolving guiding means according to claim 18, wherein two adjoining cage elements (13) are always connected to each other via a film hinge (27, 27a).

20. Revolving guiding means according to claim 19, wherein the guiding extensions (16, 16a) of the two adjoining cage elements (13) are connected to each other via the film hinge (27, 27a).

21. Revolving guiding means according to claim 18, wherein the cage elements (913) are made of plastic.

* * * * *